US010746617B2

(12) United States Patent
Walde

(10) Patent No.: US 10,746,617 B2
(45) Date of Patent: Aug. 18, 2020

(54) MEASUREMENT TRANSDUCER FEED DEVICE

(71) Applicant: SICK ENGINEERING GMBH, Ottendorf-Okrilla (DE)

(72) Inventor: David Walde, Steina (DE)

(73) Assignee: SICK ENGINEERING GMBH, Ottendorg-Okrilla (DE)

( * ) Notice: Subject to any disclaimer, the term of this patent is extended or adjusted under 35 U.S.C. 154(b) by 162 days.

(21) Appl. No.: 16/000,061

(22) Filed: Jun. 5, 2018

(65) Prior Publication Data
US 2018/0356250 A1  Dec. 13, 2018

(30) Foreign Application Priority Data

Jun. 9, 2017  (DE) .......................... 10 2017 112 775

(51) Int. Cl.
G01D 5/00 (2006.01)
G08C 19/02 (2006.01)
G01L 5/00 (2006.01)

(52) U.S. Cl.
CPC ................ G01L 5/00 (2013.01); G08C 19/02 (2013.01)

(58) Field of Classification Search
CPC . G01D 5/00; G01D 3/02; G08C 19/02; G01R 31/00; G05B 2219/25428
USPC ......................................................... 327/541
See application file for complete search history.

(56) References Cited

U.S. PATENT DOCUMENTS

| 5,237,493 A * | 8/1993 | Durig ..................... G01R 1/203 324/120 |
| 5,437,178 A * | 8/1995 | Esin ....................... G01F 23/296 367/7 |
| 9,966,837 B1 * | 5/2018 | Seaton .................. H02M 3/155 |

(Continued)

FOREIGN PATENT DOCUMENTS

| DE | 102004063735 A1 | 7/2006 |
| DE | 102007035710 A1 | 2/2009 |

(Continued)

OTHER PUBLICATIONS

European Search Report dated Nov. 6, 2018 corresponding to application No. 18176184.2-1215.
DE 102017112755.0. Office Action dated Jun. 4, 2018.

*Primary Examiner* — Randy W Gibson
*Assistant Examiner* — Gedeon M Kidanu
(74) *Attorney, Agent, or Firm* — Nath, Goldberg & Meyer; Jerald L. Meyer

(57) ABSTRACT

The invention relates to a measurement transducer feed device for process automation technology that is configured for the energy supply of a measurement transducer and for forwarding measurement signals of the measurement transducer to a control unit, wherein the measurement transducer feed device has at least two connecting contacts that are configured for coupling the measurement transducer feed device to the control unit, with a current loop being formed between the two connecting contacts, and with the current loop comprising a power tap that is configured to supply the measurement transducer with electrical energy. The measurement transducer feed device is characterized in that the current loop comprises a current regulation module that is connected or connectable in series to the power tap and to the measurement transducer.

14 Claims, 1 Drawing Sheet

(56) References Cited

U.S. PATENT DOCUMENTS

| | | | | |
|---|---|---|---|---|
| 2004/0124854 A1* | 7/2004 | Slezak | ............... | G01F 23/284 |
| | | | | 324/644 |
| 2005/0231182 A1* | 10/2005 | Huisenga | ............ | H02M 1/146 |
| | | | | 323/282 |
| 2012/0188005 A1* | 7/2012 | Bachmann | ............. | G01D 3/02 |
| | | | | 327/541 |
| 2016/0043746 A1* | 2/2016 | Schauble | ............ | H04B 5/0031 |
| | | | | 455/83 |
| 2017/0118541 A1* | 4/2017 | Kajjam | ............... | H04W 4/80 |
| 2019/0268038 A1* | 8/2019 | Gerwig | ............... | H04L 12/10 |

FOREIGN PATENT DOCUMENTS

| | | | |
|---|---|---|---|
| DE | 102009034419 | A1 | 2/2011 |
| DE | 102011087157 | A1 | 5/2013 |
| DE | 102013103454 | A1 | 10/2014 |
| DE | 102014016037 | A1 | 9/2015 |
| DE | 102016119548 | A1 | 4/2018 |

\* cited by examiner

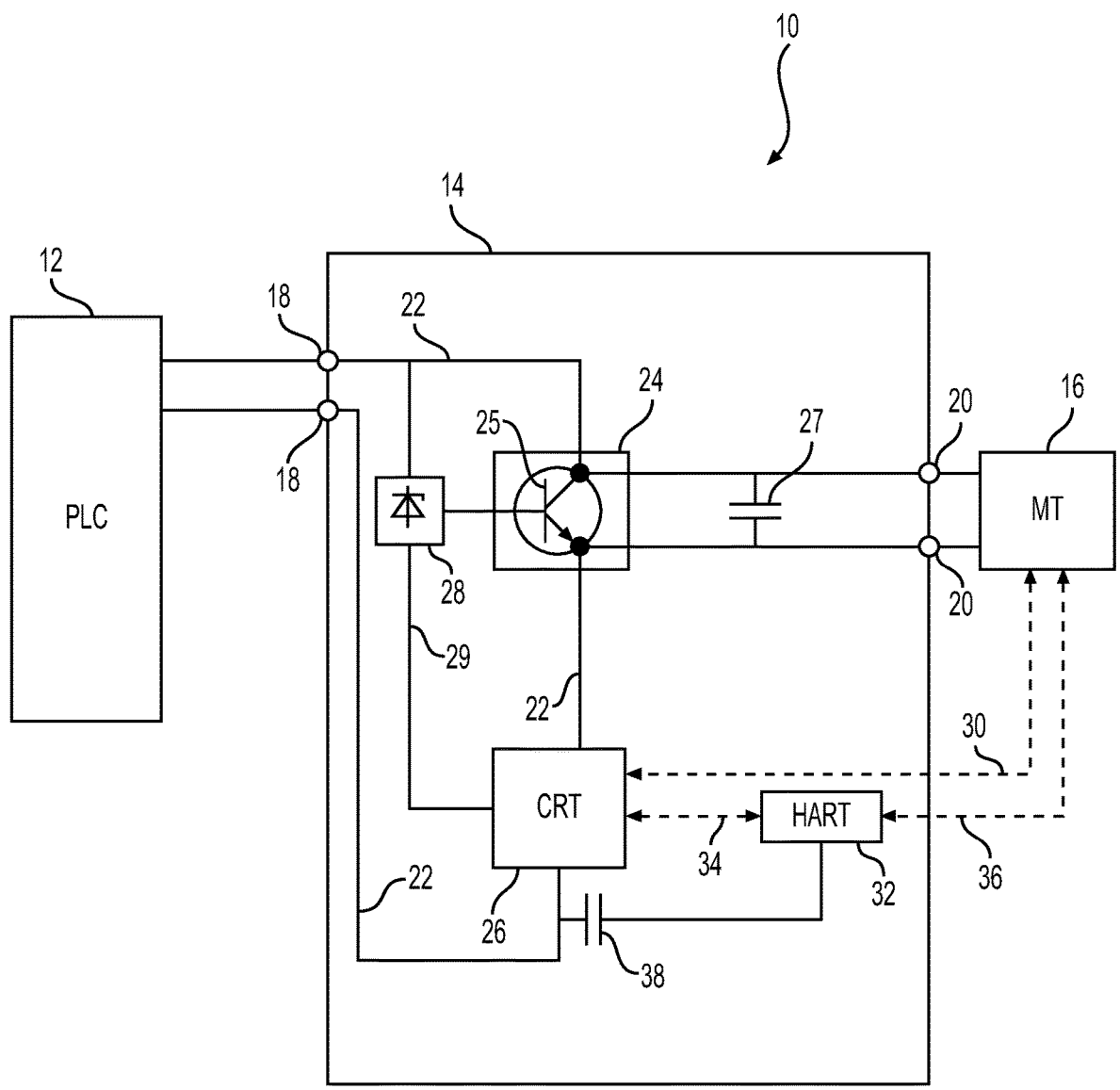

MEASUREMENT TRANSDUCER FEED DEVICE

The present invention relates to a measurement transducer feed device for process automation technology that is configured for the energy supply of a measurement transducer and for forwarding measurement signals of the measurement transducer to a control unit. The measurement transducer feed device has at least two connecting contacts that are configured for coupling the measurement transducer feed device to the control unit, wherein a current loop is formed between the connecting contacts and the current loop comprises a power tap that is configured to supply the measurement transducer with electrical energy.

Measurement transducer feed devices serve to supply measurement transducers such as temperature sensors or moisture sensors with electrical energy. At the same time, the measurement transducer feed device serves to transmit measurement data or measurement signals of the measurement transducer to the control unit. The measurement signals can in particular be transmitted by means of a current signal, for example in the range between 4 and 20 mA. A corresponding current is imparted into the current loop between the connecting contacts for this purpose. To impart the current into the current loop, the measurement transducer feed device can comprise a current regulation module that converts the measurement signal of the measurement transducer into a respective current. The control unit connected to the measurement transducer feed device can then draw a conclusion on the measurement signal or on the measurement value of the measurement transducer from the imparted current.

As a maximum, that current imparted into the current loop multiplied by the voltage applied to the measurement transducer is available as electrical energy for the supply of the measurement transducer. The available power is very small due to the small imparted current (for example 4 to 20 mA).

In addition to the measurement signal that is transmitted (at low frequency) to the control unit by means of the imparted current, additional data can be transmitted between the control unit and the measurement transducer feed device, for example by means of the HART communication system or HART protocol (HART=highway addressable remote transducer) that modulates an additional data signal onto the current of the current loop by means of high frequency signals.

The supply of the measurement transducer with electrical energy conventionally takes place, for example, via a linear regulator, optionally with a current limitation. The linear regulator here acts as a low pass filter to provide a sufficiently high impedance for the HART communication system. A low pass filter must also be connected in series to the measurement transducer with a parallel power tap in which the measurement transducer is connected in parallel with the current regulation module so that the high frequency signal of the HART communication system is not short-circuited via the low-impedance measurement transducer or via a relatively large capacitance in the high frequency range connected in parallel with the measurement transducer.

The low pass filter and also the current limitation disadvantageously require some of the energy provided via the current loop so that the electrical energy available for the measurement transducer is reduced.

It is therefore the object underlying the invention to provide a measurement transducer feed device that has a small power loss and can consequently provide a higher electrical power to the measurement transducer.

This object is satisfied by a measurement transducer feed device in accordance with the independent claim and in particular in that the current loop comprises a current regulation module that is connected or connectable in series with the power tap and the measurement transducer.

The invention is based on the recognition that the typically high-impedance current regulation module provides a high impedance of the current loop independently of the operating state or of the specific design of the measurement transducer due to the connection of the current regulation module in series to the power tap and in series to the measurement transducer. This high impedance makes possible the correction function of, for example, a HART communication system.

The high impedance of the current regulation module can in particular be achieved in that the current regulation module preferably only has a small capacitance (for example a maximum of 10 nF, preferably a maximum of 5 nF) along the current loop. A very large capacitance, e.g. of the measurement transducer or of the power tap, connected in series to the current regulation module then does not reduce the total impedance of the current loop due to the serial connection.

It is additionally of particular advantage that a low pass filter can be dispensed with since a very small impedance of the measurement transducer has practically no effect on the total impedance of the current loop due to the connection in accordance with the invention of the power tap, the measurement transducer, and the current regulation module. The energy typically consumed "wastefully" in the low pass filter can hereby be provided in accordance with the invention for the operation of the measurement transducer, whereby more electrical energy can be provided to the measurement transducer.

For example, with a voltage of 24 V applied to the two connecting contacts of the current loop and with a current of 4 mA, typically approximately 60 mW of electrical power can be provided for the operation of the measurement transducer. 5 to 8 mW more can additionally be provided to the measurement transducer in operation due to the saving or omitting of the low pass filter. The measurement transducer feed device can hereby be used more flexibly and can also be coupled to power-promoting measurement transducers.

In brief, the measurement transducer feed device in accordance with the invention does not require the function of the HART communication system or the low pass filter enabling the communication by means of high frequency signals so that the power loss typically dropping in the low pass filter can be utilized by the measurement transducer.

The imparting of the respective required current for transmitting the measurement signals is moreover possible in a simple manner due to the serial connection in accordance with the invention of the power tap and the measurement transducer, on the one hand, and the current regulation module, on the other hand, since the current regulation module can set the current to be imparted without taking the measurement transducer into account. The current regulation module can, for example, be supplied with electrical energy from the power tap.

It must be stated purely as a clarification that the current regulation module with the measurement transducer feed device in accordance with the invention is connected such that the current regulation module is connected in series to the measurement transducer as soon as the measurement transducer is electrically connected to the measurement transducer feed device (e.g. to the supply contacts explained in the following). The measurement transducer is not an element of the measurement transducer feed device.

Advantageous further developments of the invention can be seen from the description, from the dependent claims and from the drawing.

An effective capacitance of the current loop is preferably smaller than 50 nF or smaller than 10 nF, preferably smaller than 5 nF. This means that the capacitance that is effectively present (e.g. in the equivalent circuit diagram) directly between the connection terminals is e.g. less than 10 nF, preferably less than 5 nF. The superposition of the current signal on the current loop by an additional high frequency signal, e.g. of a HART communication system, is possible by the high impedance of the current loop provided in this manner. The high impedance in particular relates to the frequency range between 1 kHz and 3 kHz and preferably to the frequency range between 1.2 kHz and 2.2 kHz used by the HART communication system.

In accordance with an advantageous embodiment, the measurement transducer feed device comprises a constant voltage source that provides the current regulation module with a constant voltage.

The constant voltage source can, for example, comprise a Zener diode that is in particular connected to ground. The demands on the current regulation module can be reduced by the constant voltage at the current regulation module since the current regulation module does not have to be adapted to greatly fluctuating voltages. It is moreover of advantage that due to the constant voltage at the current regulation module the "residual" voltage at the measurement transducer is also at least substantially constant, whereby smaller demands are also present for the operation of the measurement transducer.

In accordance with a further advantageous embodiment, the power tap comprises a transistor or a bipolar transistor, in particular an NPN transistor, whose collector and emitter are connected between one of the connecting contacts and the current regulation module. The collector of the NPN transistor is advantageously coupled electrically, preferably directly, to one of the connecting contacts, whereas the emitter of the NPN transistor is coupled electrically, preferably directly, to the current regulation module.

The constant voltage delivered by the constant voltage source can be applied to the base of the NPN transistor. Alternatively or additionally, a constant current can also be provided for the power tap by the constant voltage source, for example in that the constant voltage is applied to a resistor. The constant voltage and/or the constant current can be applied to the base of the NPN transistor, whereby the NPN transistor can also act as a constant voltage source for the measurement transducer. The measurement transducer is preferably connected between an input of the power tap (for example the collector) and an output of the power tap (for example the emitter) and is thus connected in parallel with the power tap.

Alternatively or additionally to the NPN transistor, a CMOS transistor or another transistor technology can also be used.

The measurement transducer feed device can preferably comprise at least two supply contacts to which the measurement transducer can be connected. The supply contacts can be electrically connected to the power tap. For example, a first supply contact is connected, in particular directly, to the input of the power tap and a second supply contact is connected, in particular directly, to the output of the power tap.

In accordance with a further advantageous embodiment, the current regulation module is configured to impart a current dependent on the measurement signals of the measurement transducer into the current loop. The measurement signals of the measurement transducer can be an analog and/or digital representation of the value measured by the measurement transducer. The current imparted in the current loop by the current regulation module can preferably be in the range from 4 to 20 mA, with a current of 4 mA, for example, representing a minimal measurement value and a current of 20 mA representing a maximum measurement value of the measurement transducer. The current in the current loop can thus be dependent on the measurement value.

The current imparted in the current loop by the regulation module can also have an expanded adjustment range and can preferably be in the range from 3.5 to 21.5 mA or even 24 mA.

In accordance with a further advantageous embodiment, the measurement transducer feed device comprises a modulation unit that generates a data signal to be modulated onto the current of the current loop. The data signal can, for example, be a high frequency signal that is superposed on the current signal, but preferably does not influence the evaluation of the current signal in the control unit due to its high frequency properties. The modulation unit can in particular be part of a HART communication system (highway addressable remote transducer communication system) and/or can work according to the HART protocol. The modulation unit can accordingly also be called a HART module. The modulation unit in particular uses frequency shift keying (FSK) to modulate the data signal onto the current of the current loop. For example, the high frequency vibration used for this purpose can generate a current of ±0.5 mA, with e.g. a digital one being shown with a frequency of 1.2 kHz and a digital zero with a frequency of 2.2 kHz.

In accordance with a further advantageous embodiment, the modulation unit is coupled to the current regulation module, with the current regulation module being configured to modulate the data signal predefined by the modulation unit onto the current of the current loop. The data signal is therefore predefined by the modulation unit and is transmitted to the current regulation module, with the current regulation module then carrying out the feeding of the data signal into the current loop. The current regulation module can be coupled, also preferably capacitively, to the current loop for this purpose to modulate the high frequency data signal onto the current of the current loop. Alternatively or additionally, the modulation unit can also itself be coupled, in particular capacitively, to the current loop and can modulate the data signal itself onto the current of the current loop.

The modulation unit can also receive data modulated onto the current of the current loop via its coupling that is in particular capacitive. A bidirectional communication with the control unit can be possible by means of the modulation unit.

The modulation unit is preferably electrically connected to the current loop by means of a coupling capacitor.

The current regulation module and/or the measurement transducer are preferably each coupled or couplable to the modulation unit by means of a respective data link. The data links between the current regulation module and the modulation unit and between the measurement transducer and the modulation unit make it possible via the data signal also to read and/or fix parameters or settings of the measurement transducer and/or of the measurement transducer feed device, for example, by means of the data signal. A bidirectional communication between the control unit and the measurement transducer feed device in particular takes place by means of the data signal and of the modulation unit. It can, for example, be possible to read out a maximum measurement range of the measurement transducer by means of the data signal or to fix a sampling rate of the measurement transducer by means of the data signal. The data links can transmit data digitally and preferably bidirectionally. The data links can each comprise a galvanic separation. The data links or at least one of the data links can, for example, be based on an optical and/or inductive transmission.

In accordance with a further advantageous embodiment, the measurement transducer feed device comprises a buffer capacity that has a size of at least 100 nF, preferably of at least 1 µF, and is coupled to the power tap to take up consumption peaks of the measurement transducer. The buffer capacity can generally be greater than actually permitted for the HART communication system. The buffer capacity can in particular be connected in parallel with the measurement transducer and/or with the supply contacts. For example, higher power demands of the measurement transducer can briefly occur (that e.g. exceed the above-mentioned 50 mW) on the switching on of the measurement transducer. These consumption peaks of the measurement transducer can be cushioned by the buffer capacity even if the current in the current loop would not be sufficient for the energy consumption during the consumption peak.

A smoothing inductance and/or a common mode choke can also be connected between the power tap and the measurement transducer or the supply contacts. Unwanted current and voltage peaks can be filtered by the smoothing inductance and/or the common mode choke before they reach the measurement transducer.

The measurement transducer feed device preferably provides a galvanic separation between the current loop and the measurement transducer. For this purpose, the measurement transducer feed device can, for example, have a transformer that is connected or connectable between the power tap and the measurement transducer and/or between the power tap and the supply contacts.

The measurement transducer feed device can further preferably be configured such that it can be fastened to a top-hat rail. The measurement transducer feed device can moreover be designed as explosion-proof.

A further subject matter of the invention is a system comprising at least one measurement transducer feed device of the above-explained kind, a control unit electrically connected to the two connecting contacts of the measurement transducer feed device, and a measurement transducer that is supplied with electrical energy from the measurement transducer feed device.

The control unit can comprise a voltage supply and a control device for the HART communication system ("HART master"). The voltage supply can be designed for the HART communication system ("HART-capable voltage supply"). The voltage supply and the control device for the HART communication system can be combined in one device or installed separately. The control unit can also comprise a programmable logic controller (PLC).

The control unit is advantageously connected to the connecting contacts of the measurement transducer feed device, whereas the measurement transducer is electrically connected to the supply contacts of the measurement transducer feed device. The control unit, the measurement transducer feed device, and the measurement transducer are preferably formed separately from one another, with respective electrical connection lines of a plurality of meters in length being able to be arranged between the control unit, the measurement transducer feed device, and the measurement transducer.

The control unit can provide a constant voltage, for example 24 V, at the connecting contacts, with the control unit supplying the measurement transducer feed device and/or the measurement transducer with electrical energy due to the constant voltage.

The above-made statements and explanations, in particular with respect to preferred embodiments and advantages, apply accordingly to the system in accordance with the invention.

In accordance with an advantageous embodiment of the system in accordance with the invention, the measurement transducer is a temperature sensor, a voltage sensor, a current sensor, a flow sensor, or a proximity sensor.

The invention will be described in the following purely by way of example with reference to the drawing. There is shown:

The sole drawing FIGURE schematically illustrates a system composed of a programmable logic controller, a measurement transducer feed device, and a measurement transducer.

The sole drawing FIGURE shows a system 10 that serves for the detection of measurement values. The system 10 comprises a programmable logic controller (PLC) 12, a measurement transducer feed device 14, and a measurement transducer (MT) 16, for example a temperature sensor.

The PLC 12 comprises a voltage supply and a HART master (both not shown). The PLC 12 is electrically connected to the measurement transducer feed device 14 at two connecting contacts 18. The measurement transducer 16 is in turn electrically connected to the measurement transducer feed device 14 at two supply contacts 20.

A current loop 22 is provided between the connecting contacts 18 in the measurement transducer feed device 14. The current loop 22 is closed within the PLC 12.

The current loop 22 comprises a power tap 24 that comprises an NPN transistor 25 in an emitter circuit. The power tap 24 provides a respective constant voltage both to the measurement transducer 16 and to a current regulation module (CRT) 26 connected downstream of the power tap 24. The measurement transducer 16 is connected in parallel with the NPN transistor 25 of the power tap 24. For this purpose, one of the supply contacts 20 is connected to the collector of the NPN transistor 25 and the other one of the supply contacts 20 is connected to the emitter of the NPN transistor 25. A buffer capacity 27 is connected between the supply contacts and takes up power peaks in the electrical energy requirements of the measurement transducer 16. The buffer capacity 27 has a size of at least 1 µF.

To generate the constant voltage, the power tap 24 or the base of the NPN transistor of the power tap 24 is electrically connected to a constant voltage source 28. More precisely, the combination of the power tap 24 and the constant voltage source 28 therefore provides a constant voltage to the current regulation module 26. The constant voltage source 28 comprises a Zener diode whose first terminal is electrically connected to one of the connecting contacts 18. The other terminal of the Zener diode can be electrically connected to ground or to the other connecting contact. The current regulation module 26 can also be connected to ground by means of a connection line 29 and/or can have the same reference potential as the constant voltage source 28 through the connection line 29.

An electrical power is approximately provided for the measurement transducer 16 that corresponds to the voltage provided at the connecting contacts by the PLC 12 minus the voltage dropping at the current regulation module 26 multiplied by the current in the current loop 22.

The current regulation module 26 is coupled to the measurement transducer 16 by means of a first data link 30, with the measurement transducer 16 transmitting its respective measurement value (i.e. the measurement signal) via the first data link to the current regulation module 26. The current regulation module 26 imparts a current dependent on the measurement value in the range from 4 to 20 mA into the current loop 22 on the basis of the measurement value.

The measurement transducer feed device 14 moreover comprises a HART module (highway addressable remote transducer module) 32 that is coupled to the current regulation module by means of a second data link 34 and to the measurement transducer by means of a third data link 36. The HART module 32 (that can also be called a modulation unit) generates high frequency signals that are modulated by the current regulation module 26 onto the current in the current loop 22 to transmit digital data to the PLC 12. In a corresponding manner, the HART module 32 also receives high frequency data that are transmitted by the PLC 12 via the current loop 22. For this purpose, the HART module 32 is capacitively coupled to the current loop 22 by means of a coupling capacitor 38. Digital data can be exchanged between the measurement transducer feed device 14 and the PLC 12 by means of the HART module 32 in addition to the analog current signal imparted by the current regulation module 26. Parameters of the measurement transducer 16 can, for example, hereby be read or set.

Due to the serial connection of the current regulation module 26 relative to the power loop 24 and the measurement transducer 16, the current loop 22 always has a high impedance since the current regulation module 26 has a high impedance. The high impedance of the current regulation module 26 can, for example, be due to the fact that the current regulation module 26 has at a maximum a capacitance (along the current loop 22) of 10 nF. The total current loop 22 effectively therefore also comprises at a maximum a capacitance of 10 nF between the connecting contacts 18 in this example due to the serial connection. The current loop 22 thus has a high impedance, in particular in the frequency range used by the HART module 32.

It is hereby made possible that no separate low pass filter is required that enables the function of the HART module 32 or the communication by means of high frequency signals. The power typically consumed in the low pass filter can now be provided to the measurement transducer 16, whereby measurement transducers with higher power requirements can be operated at the measurement transducer feed device 14.

REFERENCE NUMERAL LIST

10 system
12 PLC
14 measurement transducer feed device
16 measurement transducer
18 connecting contact
20 supply contact
22 current loop
24 power tap
25 NPN transistor
26 current regulation module
27 buffer capacity
28 constant voltage source
29 connection line
30 first data link
32 HART module
34 second data link
36 third data link
38 coupling capacitor

The invention claimed is:

1. A measurement transducer feed device for process automation technology, the measurement transducer feed device being configured for an energy supply of a measurement transducer and for forwarding measurement signals of the measurement transducer to a control unit,
   wherein the measurement transducer feed device has at least two connecting contacts that are configured for coupling the measurement transducer feed device to the control unit, with a current loop being formed between the at least two connecting contacts, and with the current loop comprising a power tap that is configured to supply the measurement transducer with electrical energy, and
   wherein the current loop comprises a current regulation module that is connected or connectable in series to the power tap and to the measurement transducer, the current loop having an effective capacitance less than 10 nF.

2. The measurement transducer feed device in accordance with claim 1, wherein the effective capacitance of the current loop is less than 5 nF.

3. The measurement transducer feed device in accordance with claim 1, further comprising a constant power source that provides a constant voltage to the current regulation module.

4. The measurement transducer feed device in accordance with claim 1, wherein the current regulation module is configured to impart a current dependent on the measurement signals of the measurement transducer into the current loop.

5. The measurement transducer feed device in accordance with claim 1, further comprising a buffer capacity that has a size of at least 100 nF and that is coupled to the power tap to take up consumption peaks of the measurement transducer.

6. The measurement transducer feed device in accordance with claim 5, wherein the buffer capacity has a size of at least 1 µF.

7. The measurement transducer feed device in accordance with claim 1, wherein the power tap comprises a transistor, the transistor having a collector and an emitter, the collector and the emitter being connected between one of the connecting contacts and the current regulation module.

8. The measurement transducer feed device in accordance with claim 7, wherein the transistor is an NPN transistor.

9. The measurement transducer feed device in accordance with claim 1, further comprising a modulation unit that generates a data signal to be modulated onto the current of the current loop.

10. The measurement transducer feed device in accordance with claim 9, wherein the modulation unit is coupled to the current regulation module, with the current regulation unit being configured to modulate the data signal predefined by the modulation unit onto the current of the current loop.

11. The measurement transducer feed device in accordance with claim 9, wherein at least one of the current regulation module and the measurement transducer is coupled or couplable to the modulation unit by means of a respective data link.

12. A system comprising a measurement transducer feed device, a control unit electrically connected to at least two connecting contacts of the measurement transducer feed device, and a measurement transducer that is supplied with electrical energy by the measurement transducer feed device, wherein said measurement transducer feed device is suitable for process automation technology, the measurement transducer feed device being configured to forward measurement signals of the measurement transducer to the control unit, wherein the measurement transducer feed device has said at least two connecting contacts, the at least two connecting contacts being configured to couple the measurement transducer feed device to the control unit, with a current loop being formed between the at least two connecting contacts, and with the current loop comprising a power tap that is configured to supply the measurement transducer with electrical energy, and wherein the current loop comprises a current regulation module that is connected or connectable in series to the power tap and to the measurement transducer, the current loop having an effective capacitance less than 10 nF.

13. The system in accordance with claim 12, wherein the measurement transducer is one of a temperature sensor, a voltage sensor, a current sensor, a flow sensor, and a proximity sensor.

14. A measurement transducer feed device for process automation technology, the measurement transducer feed device being configured for an energy supply of a measurement transducer and for forwarding measurement signals of the measurement transducer to a control unit, wherein the measurement transducer feed device has at least two connecting contacts that are configured for coupling the measurement transducer feed device to the control unit, with a current loop being formed between the at least two connecting contacts, and with the current loop comprising a power tap that is configured to supply the measurement transducer with electrical energy, wherein a buffer capacity is coupled to the power tap to take up consumption peaks of the measurement transducer, the buffer capacity having a size of at least 100 nF, and wherein the current loop comprises a current regulation module that is connected or connectable in series to the power tap and to the measurement transducer.

\* \* \* \* \*

UNITED STATES PATENT AND TRADEMARK OFFICE
CERTIFICATE OF CORRECTION

PATENT NO. : 10,746,617 B2  
APPLICATION NO. : 16/000061  
DATED : August 18, 2020  
INVENTOR(S) : David Walde It is certified that error appears in the above-identified patent and that said Letters Patent is hereby corrected as shown below:

On the Title Page

Please delete and replace the Assignee City with the following:  
(73) Assignee: SICK ENGINEERING GMBH, Ottendorf-Okrilla (DE)

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*